United States Patent

[11] 3,572,814

[72] Inventor Raymond A. Ravenel
        Paris, France
[21] Appl. No. 759,061
[22] Filed Sept. 11, 1968
[45] Patented Mar. 30, 1971
[73] Assignee Societe Anonyme Andre Citroen
        Paris, France

[54] DEVICES FOR INTERCONNECTING THE BODY AND CHASSIS OF VEHICLES
    4 Claims, 12 Drawing Figs.

[52] U.S. Cl. .................................................. 296/35
[51] Int. Cl. .............................................. B62d 27/04
[50] Field of Search ............................................ 296/35; 267/63

[56] References Cited
UNITED STATES PATENTS
1,439,802 12/1922 DeMiranda ................. 296/35UX
2,142,173 1/1939 Broluska ...................... 296/35X
2,485,794 10/1949 Waterbury et al. ........... 296/35
2,715,041 8/1955 Fierbaugh et al. ............ 296/35
FOREIGN PATENTS
575,947 5/1924 France ........................ 296/35
646,744 6/1937 Germany ..................... 296/35
608,688 2/1948 Great Britain ................ 296/35

Primary Examiner—Benjamin Hersh
Assistant Examiner—John A. Pekar
Attorney—Wenderoth, Lind & Ponack ABSTRACT: The connecting device between a body and a sprung chassis of a vehicle of which the body fits freely in an aperture of the chassis comprises, at their interfitting portions, connecting members providing a pendular suspension of the body in relation to the chassis in the longitudinal direction of the vehicle and permitting a limited movement of the body.

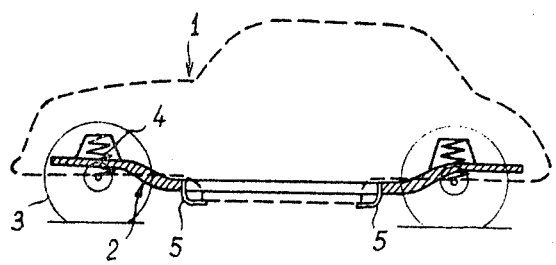
Fig. 1
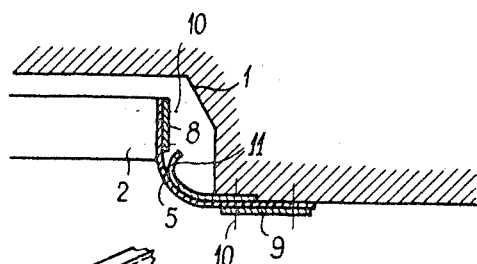
Fig. 2
Fig. 3
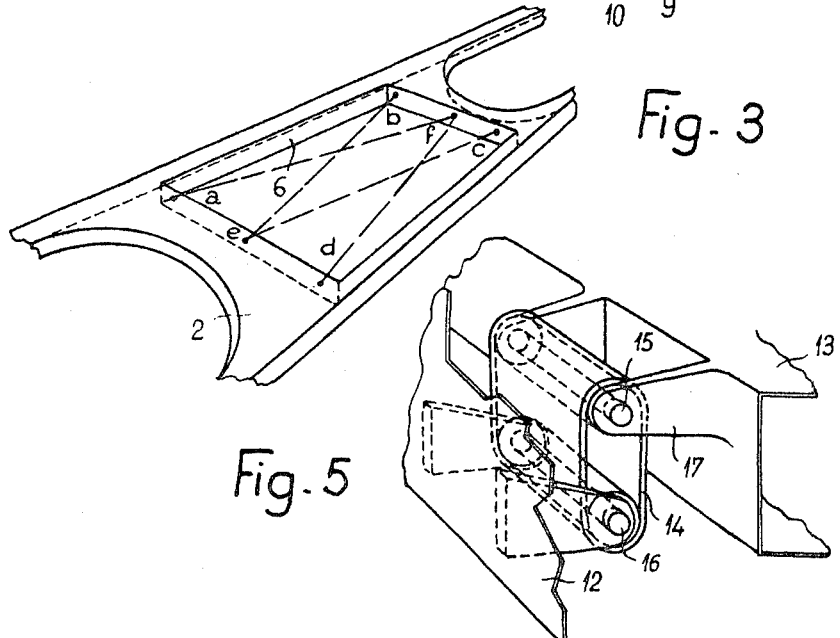
Fig. 5
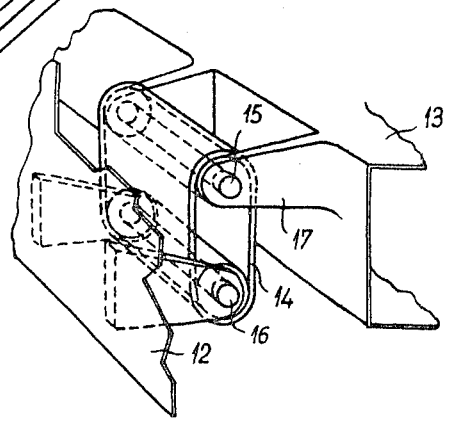
Fig. 4
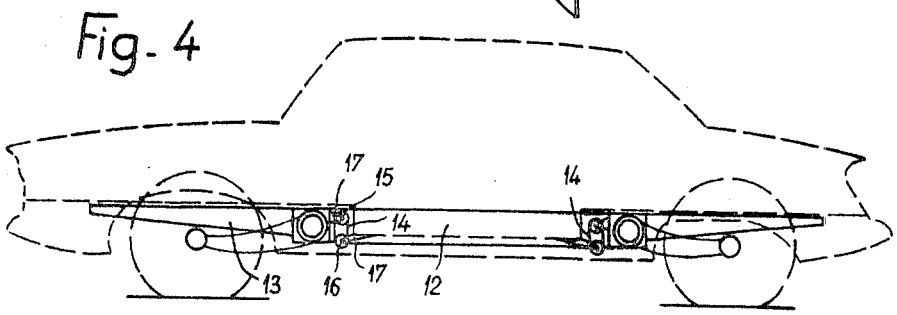

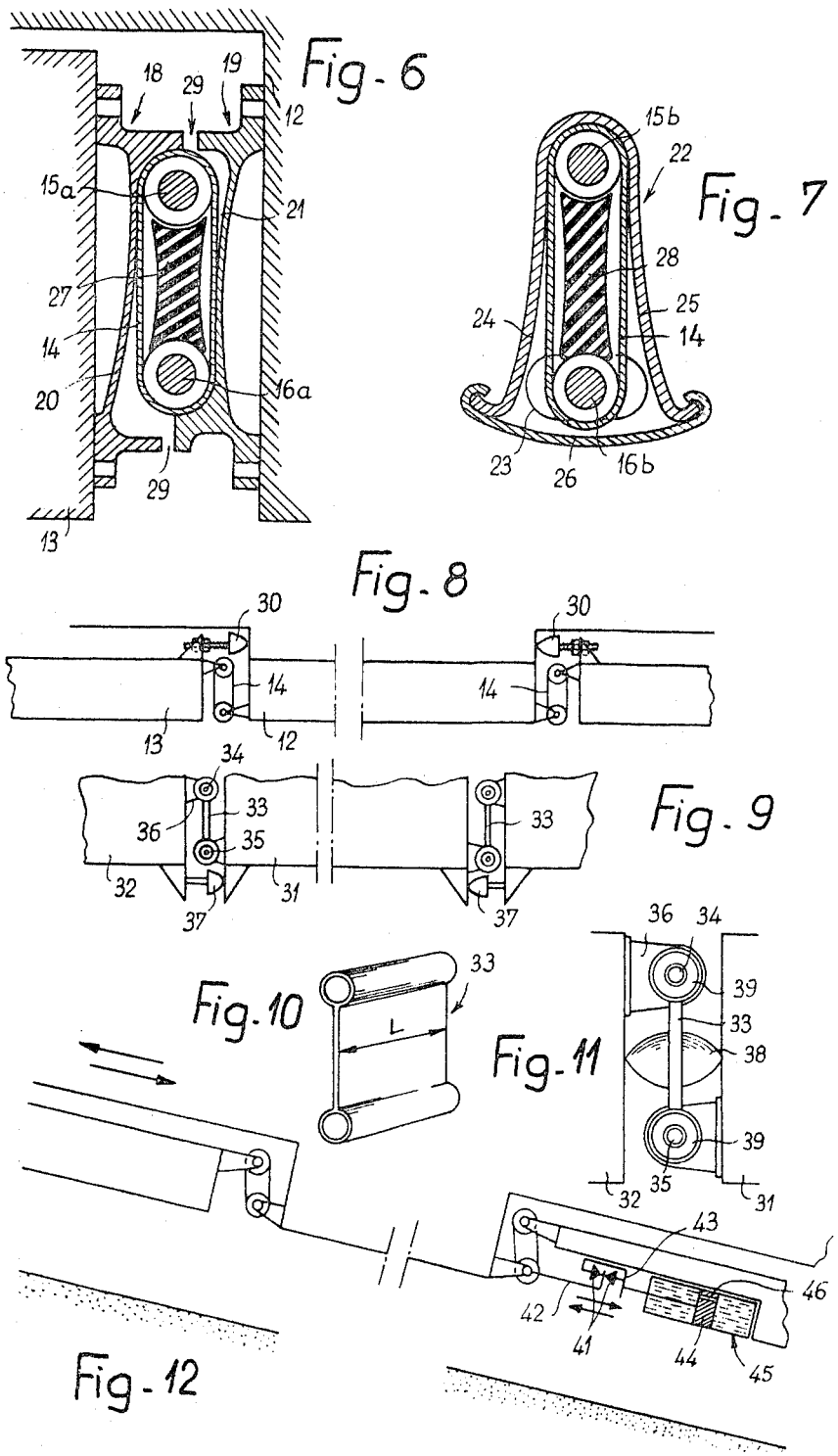

DEVICES FOR INTERCONNECTING THE BODY AND CHASSIS OF VEHICLES

The present invention is directed to provide means for attenuating, in automotive vehicles, the effects of external disturbing forces such as vibration, shocks or various inertia effects, on the passengers or the freight carried by the vehicles, by providing to this end improved means for connecting the body to the chassis of the vehicle, these means being integrated in the conventional damping or shock-absorbing system of the vehicle.

This invention is applicable more particularly to rolling vehicles (automobiles, trailers, railway cars, etc.) and also to vehicles supported above the ground by reaction thereagainst (air cushion vehicles), and also to sea and aircrafts.

Basically, the connecting device according to this invention, which is to be interposed between the body and chassis of a vehicle, is characterized in that it comprises connecting members providing a pendular suspension of the body in relation to the chassis in the longitudinal direction of the vehicle.

It will be seen that these members are designed with a view to preserve a satisfactory transverse connecting stiffness between the body and chassis of the vehicle.

Preferably, the arrangement further comprises resilient pads disposed between the chassis and body of the vehicle for limiting the beat of said pendular suspension.

Several forms of embodiment of the connecting device according to this invention will now be described by way of example with reference to the attached drawing in which:

FIG. 1 is a general diagrammatic view of a vehicle to illustrate the principle of a chassis-to-body connecting device according to this invention;

FIG. 2 is a detail view showing in longitudinal section one of the connecting means incorporated in the structure of FIG. 1;

FIG. 3 is a perspective view showing in a chassis the various locations of a device according to this invention;

FIG. 4 is a general diagrammatic view of a vehicle incorporating another form of embodiment of the chassis-to-body connecting means of this invention;

FIG. 5 is a detail perspective view showing one of the connecting means of FIG. 4;

FIG. 6 and 7 are vertical longitudinal sections showing two different forms of embodiment, respectively at the front and at the rear, of the connecting device of this invention;

FIG. 8 is a fragmentary view showing two front and rear connecting means provided between the body and chassis of the vehicle;

FIG. 9 is a diagrammatic view showing a modified structure of the front and rear connecting means provided between the body and chassis of the vehicle;

FIG. 10 is a perspective view showing separately one of the links of the device of FIG. 9;

FIG. 11 is an external view showing a modified form of embodiment of a connecting structure utilizing the link illustrated in FIG. 10; and FIG. 12 is a diagrammatic side elevational view showing a specific mounting of the beat-limiting pads.

Referring first to FIGS. 1 and 2 of the drawing it will be seen that a connecting device according to this invention between an automobile body (shown in dash lines in FIG. 1), denoted generally by the reference numeral 1, and a sprung chassis designated by the reference numeral 2, is independent of the conventional suspension system provided between the chassis and the wheels 3, which in this example is shown diagrammatically in the form of springs 4 and is no part of the present invention; besides, this suspension system may be of any desired and suitable type.

The connecting means provided between the body 1 and chassis 2 for the purpose of providing a pendular suspension of the body in relation to the chassis in the longitudinal direction of the vehicle consist of straps or belts 5 disposed at longitudinally spaced points of the vehicle; these straps, in the example shown in FIG. 3, may be four in number (as at $a$, $b$, $c$ and $d$), or three ($a$, $f$, $d$ or $b$, $e$, $c$), and located in an aperture 6 formed in the chassis and adapted to receive the vehicle body with a certain longitudinal clearance. Each strap 5 is attached at one end to the underface of the body 1 and at the other end to a vertical face of the chassis aperture 6. The belt may be secured by means of clamping plates 8 and 9 of which the fastening members 10 to the chassis or body extend through said belts.

Preferably, each belt is adapted to coact with a bearing contour 11 consisting of a member or insert secured to the body and shaped to permit a gradual winding and unwinding contact of the strap on this surface according to the relative body-to-chassis movements taking place during the operation of the vehicle.

With this connection, during a normal drive the body is in a balanced condition and has a position of equilibrium in which the straps 5 engage only partially their companion rounded bearing contours 11, and the dynamic effects exerted on the chassis as a consequence of road unevennesses met by the rolling wheel are damped during their transmission to the body, as a function not only of the damping action produced by the strap material which is then tension stressed and may consist of elastic strips, but also of the relative movements which are permitted by said straps between the body and chassis and caused by inclination variations caused by the stress thus applied to said straps.

The temporary velocity variations producing longitudinal inertia differential effects may create a longitudinal relative movement of the body with respect to the chassis, which may then cause the front and rear straps to coact in the opposite direction with respect to their bearing surfaces 11; in other words, the bearing surfaces on which said strap then tend to become wound act as retarders and limiters as far as the relative movement between the body and chassis is concerned, the existence of this retarding and limiting action attenuating the reactions which would otherwise be a cause of discomfort to the passengers.

The limitation of the longitudinal beat between the body and chassis of the vehicle may be obtained by using a positive abutment between the chassis 2 and the strap bearing surface 11, or alternately by using resilient pads adapted to be interposed to this end between the body and the chassis.

However, the use of the above-described suspension straps does not interfere with the preservation of a suitable transverse rigidity between the body and chassis.

According to a modified form of embodiment illustrated in FIGS. 4 to 8 inclusive, the connecting members provided between the body 12 and chassis 13 consist of sleeves 14 having for example the shape of a relatively wide rings or large cylinder, these sleeves 14 being each engaged on two supporting pins disposed transversely to the longitudinal centerline of the vehicle and secured the one 15 on the vertical transverse face of the aforesaid aperture 6 of chassis 13 and the other 16 on the opposite vertical face of the body 12, between lugs 17 preventing any axial movements of said sleeves along said pins. The location of these connecting members may be selected as in the preceding example.

These sleeves 14 may be used notably in combination with bearing ramps as shown in the specific forms of embodiment shown in FIGS. 6 and 7.

In the case illustrated in FIG. 6 one pin 15$a$ supporting the sleeve 14 is carried by a bracket 18 secured to the chassis 13 and the other supporting pin 16$a$ is carried by another bracket 19 secured to the body 12. These brackets are formed with registering ramps 20 and 21 providing gradually increasing bearing surfaces for the sleeves.

In the example illustrated in FIG. 7 the sleeve 14 is mounted in a closed case 22 adapted to be secured laterally in the aperture 6 formed in the chassis for receiving the body 12, together with pin 15$b$ supporting the sleeve. The pin 16$b$ rigid with the body engages the sleeve 14 by extending through a buttonhole or elongated aperture 23 formed in the lateral wall of case 22 to permit a certain mutual movement between the body and chassis. This case 22 is shaped to provide on either side of the sleeve 14 a pair of ramps 24, 25 permitting the gradual engagement thereof by the sleeve 14. It is provided with a protection cover 26.

In either case there is interposed in the sleeve, between its supporting pins, a distance piece or member preferably of elastic material 27 (FIG. 6), 28 (FIG. 7) fitted between these pins with a certain play in the static condition of the suspension, the role of these distance piece or members being discussed in detail presently.

With the above-described body-to-chassis connecting means, when the vehicle is at a standstill on a level the sleeves are substantially vertical.

Under stabilized driving conditions, the body assumes with respect to the chassis a position of equilibrium corresponding to a certain inclination of said sleeves.

The dynamic effects produced by road or ground unevennesses are the cause of variations in the tractive stress exerted on the sleeves. With due consideration for their damping characteristics depending on their structure and/or materials, and also to the variations in inclination to which they are likely to be subjected, the sleeves absorb a considerable fraction of the vibration thus generated, so that they prevent the transmission of any vibration to the body sections and the perception of this vibration by the passengers.

The temporary velocity variations (accelerations, decelerations) produce on the other hand longitudinal inertia differential effects creating a relative horizontal movement between the chassis and the body; since these straps or sleeves are neither designed nor arranged for counteracting this action, they will then pivot about their supporting pins rigid with the chassis. In the case illustrated in FIGS. 6 and 7 the sleeves are caused to react strongly and gradually, under these conditions to be discussed more in detail hereinafter, against their bearing ramps of which the contour is designed with a view to retard and eventually stop this relative body-to-chassis movement. Of course, even in this case the sleeves are capable of acting as vibration damping means as contemplated initially.

In the specific case illustrated in FIG. 6, it will be noted that the sleeve is retarded in a single direction of the relative body-to-chassis movement; in other words, the sleeves must be mounted symmetrically at the front and rear of the body, so that the front or rear sleeves coact with their companion bearing ramps according to the direction of the relative movement between the body and chassis. However, the actual cooperation of each sleeve with its associated bearing ramps 20, 21 is of bilateral character. In this specific example, a positive stop limiting the relative movements between the body and chassis can easily be provided between the brackets, as at 29.

In the example illustrated in FIG. 7 each sleeve of the connecting device is of the double-acting type, but only one span of the sleeve is retarded or braked against only one or the other of its bearing ramps 24, 25.

The great-amplitude beats, the shock effects caused by major ground unevennesses or obstacles are a frequent source of reactions (jolts and jars) suddenly unloading or relieving the connecting points and possibly causing the sleeves to be suddenly slackened with attended loss of contact with the supporting pins; the detrimental consequences of these effects are avoided by the interposition of distance pieces such as 27 and 28 between these pins. In this case the distance piece absorbs the thrust applied thereto and permits by temporary elastic deformation of preserving the continuity of the connection in the direction of these sleeves without interfering with the antivibratory efficiency of the connecting means, due notably to the static mounting play thereof.

When driving the vehicle along a sinuous road, i.e. under conditions developing transverse inertia effects (centrifugal force) the orientation and the advantageously flat cross-sectional configuration of the sleeves afford a very satisfactory resistance to the stress applied thereto; therefore, the chassis-to-body relative movement is extremely reduced.

Also with this type of connecting means, the longitudinal beats between body and chassis are controlled and limited by the resilient pads interposed between the body and the chassis, as shown in FIG. 8 wherein elastic pads 30 are provided in a connecting device of the type illustrated in FIGS. 4 and 5, but these pads can also be used in the connecting device illustrated in FIGS. 6 and 7.

According to a different form of embodiment illustrated in FIGS. 9 to 11 inclusive the connecting members provided between the body 31 and chassis 32 consist of links 33 each engaged on a pair of transverse supporting pins secured the one 34 to the chassis 32 and the other 35 to the body 31 between supporting lugs 36 preventing any movement of these links along said pins. These links may easily be constructed with a width L sufficient to warrant a satisfactory transverse stiffness of the connection.

Associated with this link system are elastic pads or abutments serving the purpose of controlling and limiting the longitudinal relative movements between the body and chassis; these elastic pads are advantageously mounted on the body and chassis as in the case of pads 37 of FIG. 9, or on the link body as in the case of pads 38 of FIG. 11.

Preferably, these links 33 are mounted on their pivot pins with the interposition of elastic bushings such as 39 (see FIG. 11).

The body-to-chassis connecting means described hereinabove are exposed to efforts exerted on the limiting pads which may prove detrimental to the efficiency of the chassis-to-body insulation when driving down steep hills. This inconvenience may easily be avoided by replacing the fixed pads or abutments described hereinabove by a device adapted automatically to align these pads or abutments with the registering reaction bearings, irrespective of the relative chassis-to-body positions and the incident angle of the pendular connecting elements. A typical mounting of this type is illustrated in FIG. 12 wherein elastic abutments or pads 41 disposed on either side of a bearing member 42 rigid with the chassis are secured to a strap 43 coupled to the rod of a piston 44 slidably mounted in a cylinder 45 filled with a suitable fluid and rigid with the chassis, this piston 44 being provided with a calibrated orifice 46 permitting under the efforts applied to the connecting means the transfer of said liquid between the two chambers of cylinder 45.

Of course, to each modification in the equilibrium between the body and chassis there will correspond a retarded movement of translation of the movable assembly 41 to 44, thus providing a modified stabilization consistent with the momentary conditions.

Thus, in no case the elastic pads 41 are misaligned with respect to the body bearing constituted by the member 42, and their stabilizing actions are continued without being disturbed.

It will be noted that the remarkable antivibratory efficiency characterizing all the above-described devices permits of dispensing with certain conventional elastic insulating materials and devices provided between various mechanical components, notably between the axles and the chassis. This important feature of the present invention provides new outlooks as far as the improvements in the stiffness of these chassis is concerned; therefore, considerable improvements can be derived therefrom in connection with the road-holding properties of motor vehicles.

Of course, other modified forms of embodiment may be contemplated without departing from the spirit and scope of the invention.

I claim:

1. Connecting device disposed between the body and the sprung chassis of a vehicle wherein the body and chassis have free mutual interfitting vertical faces, comprising connecting members at the mutual interfitting faces of said body and chassis forming a pendular suspension for said body relative to said chassis in the longitudinal direction of the vehicle permitting a limited movement of said body in relation to said chassis, said connecting members comprising supporting sleeves, supporting pins disposed transversely of the vehicle and rigid with the vertical interfitting faces respectively of said chassis and body on which said sleeves are engaged, and bearing ramps coacting with said connecting members adapted gradually to limit their movements.

2. Connecting device according to claim 1 wherein said supporting sleeves comprise in their inner space a distance piece disposed between said supporting pins.

3. Connecting device according to claim 1 wherein there is provided between said chassis and said body a plurality of elastic pads for limiting the movements of said pendular suspension.

4. Device according to claim 1 wherein at least two abutment members are disposed on either side of a connecting member to constitute therewith a body-to-chassis connection including a hydraulic dashpot-forming cylinder.

UNITED STATES PATENT OFFICE
CERTIFICATE OF CORRECTION

Patent No. 3,572,814     Dated March 30, 1971

Inventor(s) Raymond A. Ravenel

It is certified that error appears in the above-identified patent and that said Letters Patent are hereby corrected as shown below:

In the Front Page of the Patent, after the name and address of the Assignee, the following should be inserted:

--[32]  Priority   Sep. 19, 1967
                   France
                   P.V. 121.487 --

Signed and sealed this 27th day of June 1972.

(SEAL)
Attest:

EDWARD M. FLETCHER, JR.      ROBERT GOTTSCHALK
Attesting Officer            Commissioner of Patents